United States Patent
Schon et al.

(10) Patent No.: US 12,132,211 B2
(45) Date of Patent: Oct. 29, 2024

(54) SYSTEMS AND METHODS FOR AIR CATHODES

(71) Applicant: e-Zinc Inc., Toronto (CA)

(72) Inventors: Tyler Schon, Toronto (CA); Sannan Yousaf Toor, Toronto (CA); Andrew Rassenti, Toronto (CA)

(73) Assignee: e-Zinc Inc., Toronto (CA)

( * ) Notice: Subject to any disclaimer, the term of this patent is extended or adjusted under 35 U.S.C. 154(b) by 596 days.

(21) Appl. No.: 17/520,177

(22) Filed: Nov. 5, 2021

(65) Prior Publication Data

US 2023/0146290 A1 May 11, 2023

(51) Int. Cl.
| H01M 4/66 | (2006.01) |
| H01M 4/04 | (2006.01) |
| H01M 4/74 | (2006.01) |
| H01M 4/88 | (2006.01) |
| H01M 4/90 | (2006.01) |

(52) U.S. Cl.
CPC ....... *H01M 4/9016* (2013.01); *H01M 4/8828* (2013.01); *H01M 4/8896* (2013.01)

(58) Field of Classification Search
None
See application file for complete search history.

(56) References Cited

U.S. PATENT DOCUMENTS

| 4,595,643 A | 6/1986 | Koshiba et al. |
| 4,892,637 A | 1/1990 | Sauer et al. |
| 5,308,711 A | 5/1994 | Passaniti et al. |
| 5,378,562 A | 1/1995 | Passaniti et al. |
| 6,632,557 B1 | 10/2003 | Curelop et al. |
| 6,780,347 B2 | 8/2004 | Ndzebet |
| 7,070,878 B2 | 7/2006 | Venkatesan et al. |
| 7,097,933 B2 | 8/2006 | Ovshinsky et al. |
| 8,652,685 B2 | 2/2014 | Guo |
| 8,895,467 B2 | 11/2014 | Sun et al. |
| 8,974,964 B2 | 3/2015 | Padhi et al. |
| 2005/0153198 A1 | 7/2005 | Suzuki et al. |
| 2006/0019130 A1 | 1/2006 | Katikaneni et al. |
| 2011/0189590 A1 | 8/2011 | Guo |
| 2017/0207464 A1 | 7/2017 | Gyenge et al. |

FOREIGN PATENT DOCUMENTS

| EP | 2 424 016 | 2/2012 |
| WO | WO-00/44057 | 7/2000 |
| WO | 03/067685 A2 | 8/2003 |
| WO | WO-2007/023964 A1 | 3/2007 |
| WO | WO-2013/105292 | 7/2013 |
| WO | WO-2014/036513 | 3/2014 |
| WO | WO-2017/100743 | 6/2017 |
| WO | 2019/241531 A1 | 12/2019 |
| WO | 2020/072783 A1 | 4/2020 |
| WO | WO-2020/153401 | 7/2020 |

OTHER PUBLICATIONS

International Search Report and Written Opinion dated Jan. 24, 2023 on PCT/CA2022/051630.

*Primary Examiner* — Fred M Teskin
(74) *Attorney, Agent, or Firm* — Brunet & Co. Ltd.; Robert Brunet; Hans Koenig

(57) ABSTRACT

An apparatus which can include a cathode membrane for a power source is provided. The power source can include a current collector which can include a porous substrate. The power source can include a layer that coats the porous substrate to provide a catalyst for the cathode membrane. The layer can be formed from a mixture of hausmannite and cation intercalated manganese oxide.

3 Claims, 14 Drawing Sheets

SYSTEMS AND METHODS FOR AIR CATHODES

BACKGROUND

Electrochemical energy conversion and storage devices such as fuel cells and batteries can include a single or plurality of anode(s), cathode(s), and electrolyte(s). The fuel cells or batteries can utilize the electrochemical oxygen reduction reaction.

SUMMARY

At least one aspect of the present disclosure is directed to an apparatus which can include a cathode membrane for a power source. The power source can include a current collector which can include a porous substrate. The power source can include a layer that coats the porous substrate to provide a catalyst for the cathode membrane. The layer can be formed from a mixture of hausmannite and cation intercalated manganese oxide.

Another aspect of the present disclosure is directed to a system which can include a power source electronically to couple with an electrical component to provide power to the electrical component. The power source can include an anode. The power source can include an electrolyte. The power source can include a cathode membrane. The cathode membrane can include a current collector which can include a porous substrate. The cathode membrane can include a layer that coats the porous substrate to provide a catalyst for the cathode membrane. The layer can be formed from a mixture of hausmannite and cation intercalated manganese oxide. The electrolyte to couple with the anode and the cathode membrane can convert energy stored in the power source to electrical energy to provide the power to the electrical component.

Another aspect of the present disclosure is directed to a method of manufacturing an air cathode. The method can include forming a sodium formate solution. The method can include forming a potassium permanganate solution. The method can include mixing the sodium formate solution with the potassium permanganate solution to create a mixture of hausmannite and potassium intercalated manganese oxide to create a catalyst.

Those skilled in the art will appreciate that the summary is illustrative only and is not intended to be in any way limiting. Other aspects, features, and advantages of the devices or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Electrochemical energy conversion and storage devices such as fuel cells and metal air batteries can utilize the electrochemical oxygen reduction reaction (ORR). At a cell level, the ORR can be carried out on an air cathode and can be a limiting reaction (e.g., the ORR can contribute the highest normalized resistance to the energy conversion process). Air cathodes can utilize noble metals such as platinum for its high activity, conductivity, and stability. However, use of platinum, ruthenium, and other noble metal can increase the cost of these electrochemical energy conversion and storage devices, which stands as a major barrier towards commercialization of these devices.

Non-noble transition metal catalysts for the oxygen reduction reaction can include various classes of materials including perovskites, spinels, and mixed metal oxides. A possible catalyst material can include manganese oxides which have a high activity (attributed to its ability to exist in multiple oxidation states) and low cost. However, use of manganese oxides in air cathodes has limitations due to the physical and chemical degradation of the manganese oxides. This degradation can eventually lead to short cell life, which limits the feasibility of manganese oxides in commercial air cathode applications. Manganese oxide can degrade through reduction under an applied potential whereby the oxidation state of manganese changes to a lower positive state. Oxidation state change (e.g., variation in oxidation state) can be accompanied by changes in crystal structure, which can lead to physical stress in the catalyst (e.g., catalyst matrix). The physical stress can lead to collapsing of pores within the catalyst and breaking away or chipping of the catalyst. Lower oxidation state manganese oxides can be less active as ORR catalysts. The ORR may also be accompanied by formation of peroxide ions as an intermediate species. The presence of peroxide ions can poison (e.g., lead to the destruction or degradation of) manganese oxides, thereby causing the manganese oxides to dissolve in high pH solutions. The peroxide ions can degrade the manganese oxides which can lead to air cathode degradation. The catalyst containing manganese oxide can interact with the peroxide ions which can lead to the dissolution or degradation of the catalyst. Further, commercial air cathodes that use electrolytic manganese dioxide (EMD) can be prone to chemical and physical degradation at applied potentials.

Following below are more detailed descriptions of various concepts related to, and implementations of, methods, apparatuses, and systems for cathode membrane catalysts. The various concepts introduced above and discussed in greater detail below may be implemented in any of a number of ways, as the described concepts are not limited to any particular manner of implementation. Examples of specific implementations and applications are provided primarily for illustrative purposes.

Figure 1C:
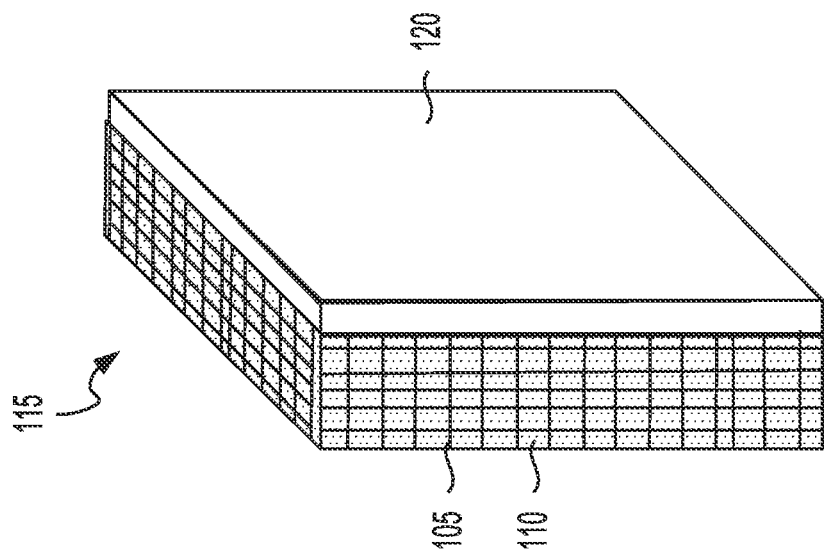
FIG. 1C illustrates a cathode membrane according to an example implementation.
Figure 1B:
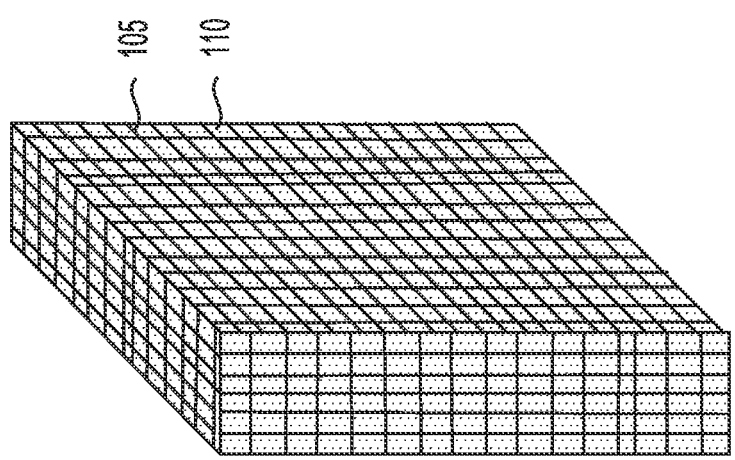
FIG. 1B illustrates a current collector with a hydrophobic mass according to an example implementation.
Figure 1A:
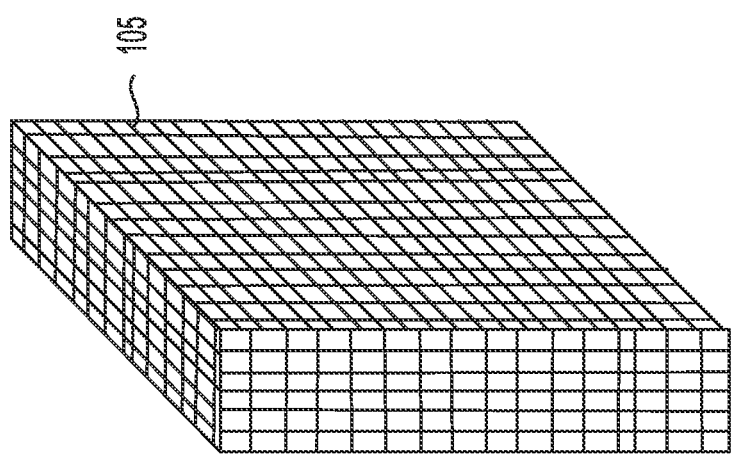
FIG. 1A illustrates a current collector according to an example implementation.

FIG. 1A illustrates a current collector 105. The current collector 105 can include a current collector foam or a bare current collector foam. The current collector 105 can include a porous substrate (e.g., porous metal substrate). The current collector 105 can include a foam (e.g., nickel foam, copper foam, silver foam, metal foam, metal alloy foam, etc.). The current collector 105 can include a mesh (e.g., nickel mesh, copper mesh, silver mesh, metal mesh, metal alloy mesh, etc.). The current collector 105 can include a mesh structure. The mesh structure can include at least one of nickel, copper, or silver.

FIG. 1B illustrates the current collector 105 with a hydrophobic mass 110 (e.g., hydrophobic material). The current collector 105 can be impregnated with the hydrophobic mass 110. The current collector foam can be impregnated with the hydrophobic mass 110. The current collector 105 can include a mass that is hydrophobic (e.g., hydrophobic mass 110). The mass can be formed from polytetrafluoroethylene (e.g., PTFE, Teflon®) and carbon. The hydrophobic mass 110 can impregnate the current collector 105. For example, the hydrophobic mass 110 can be positioned in pores of the current collector 105. The hydrophobic mass 110 can be positioned in pores of the nickel foam. The current collector 105 can contain a mass that is hydrophobic (e.g. hydrophobic mass 110). The current collector 105 can contain a layer that is hydrophobic (e.g., hydrophobic layer).

FIG. 1C illustrates a cathode membrane 115 (e.g., air cathode, impregnated air cathode, impregnated air cathode architecture, etc.). An apparatus can include the cathode membrane 115. The cathode membrane 115 can be used for a power source (e.g., power source component). The cathode membrane 115 can include the current collector 105. The current collector 105 can include a porous substrate. The current collector 105 can include a foam (e.g., nickel foam, copper foam, silver foam, metal foam, metal alloy foam, etc.). The current collector 105 can include a mesh (e.g., nickel mesh, copper mesh, silver mesh, metal mesh, metal alloy mesh, etc.). The current collector 105 can include a mesh structure. The mesh structure can include at least one of nickel, copper, or silver.

The cathode membrane 115 can include a layer (e.g., active layer 120, active layer coating, etc.) that coats the porous substrate. The active layer 120 can coat the porous substrate to provide a catalyst for the cathode membrane 115. The active layer 120 can coat the current collector 105 to provide a catalyst for the cathode membrane 115. The active layer 120 can coat the current collector 105 with the hydrophobic mass 110 to provide a catalyst for the cathode membrane 115. The active layer 120 can coat the current collector 105 impregnated with the hydrophobic mass 110 to provide a catalyst for the cathode membrane 115. The current collector 105 impregnated with the hydrophobic mass 110 and coated with the active layer 120 can be known as an air cathode or an impregnated air cathode. The active layer 120 can include an active mass or active mass slurry. The active layer 120 can act as or be a catalyst for the ORR.

The active layer 120 can be formed from a mixture of hausmannite and cation intercalated manganese oxide. The catalyst can be formed from a mixture of hausmannite and cation intercalated manganese oxide. The hausmannite contained in the catalyst can be in a range of 10 wt % to 90 wt % (e.g., 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, inclusive). The cation intercalated manganese oxide contained in the catalyst can be in a range of 10 wt % to 90 wt % (e.g., 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, inclusive). The cation intercalated manganese oxide can include potassium intercalated manganese oxide. The potassium intercalated manganese oxide contained in the catalyst can be in a range of 60 wt % to 80 wt % (e.g., 60 wt %, 65 wt %, 70 wt %, 75 wt %, or 80 wt %, inclusive). The mixture of hausmannite and cation intercalated manganese oxide can be used as a catalyst for an air cathode. The mixture of hausmannite and cation intercalated manganese oxide can be used in at least one of capacitors, batteries, or other types of energy conversion or storage systems. The mixture of hausmannite and cation intercalated manganese oxide can act as or be a catalyst for the ORR.

The hausmannite can include $Mn_3O_4$. The oxidation state of the manganese in hausmannite can be between +2 and +3. The hausmannite can exist in a spinel structure. For example, the hausmannite can exist in a spinel structure between $Mn^{2+}$ and $Mn^{3+}$. The hausmannite can have a higher stability and higher or comparable activity than that of other forms of manganese oxide (e.g., Mn(IV) oxides). $Mn_3O_4$ can be synthesized using a reducing agent. $Mn_3O_4$ can be synthesized using a reducing agent with two or fewer carbon atoms (e.g., sodium formate, ethanol, etc.). $Mn_3O_4$ can be synthesized using a reducing agent which has fewer carbons per molecule (e.g., 2 or less).

The cation intercalated manganese oxide can include potassium intercalated manganese oxide. The mixture of hausmannite and cation intercalated manganese oxide can have a higher stability and higher activity compared with that of other forms of manganese oxide. The potassium intercalated manganese oxide can include $KMn_4O_{16}$. The manganese oxide without cation intercalation or potassium intercalation can have a crystal structure that includes open tunnels (e.g., open spaces, open pores, etc.). During the ORR, the open tunnels can collapse due to the changing oxidation state of the manganese. The cations (e.g., potassium ions, sodium ions, calcium ions, lithium ions, magnesium ions, iron irons, zinc ions, etc.) located in the tunnels can prevent the manganese oxide from collapsing by providing support to the manganese oxide. The cations (e.g., potassium ions) located in the tunnels can prevent the collapsing of the pores during the ORR. The cation intercalated manganese oxide can include cation-filled tunnels (e.g., tunnels filled with cations). The potassium intercalated manganese oxide can include potassium ion-filled tunnels (e.g., tunnels filled with potassium ions). The layer or active layer 120 can include potassium ions stacked in tunnels. For example, the potassium ions can fill the tunnels of the manganese oxide. Intercalation of cations in the tunnels of the manganese oxide can provide physical stability to the catalyst matrix. Intercalation of cations in the layers between the octahedral manganese oxide structures can provide physical stability to the catalyst matrix. In cation intercalated manganese oxide, the cations (e.g., potassium ions) can distort the crystal structure of the manganese oxide. This distortion can lead to slightly higher activity (compared with non-intercalated manganese oxide) due to reduced bond strength between lattice sites of the manganese oxide. The potassium intercalated manganese oxide can be synthesized using potassium permanganate as an oxidizing agent.

The mixture of hausmannite and cation intercalated manganese oxide can provide a variety of benefits. For example, the $Mn_3O_4$ can exhibit higher resistance to reduction in oxidation state because the $Mn_3O_4$ exists as a spinel like structure with an equilibrium between $Mn^{2+}$ and $Mn^{3+}$. $Mn_3O_4$ can have a comparable activity to $MnO_2$. Potassium intercalated manganese oxide can add further stability to the catalyst and can prevent physical degradation of the catalyst. The mixture of hausmannite and cation intercalated manganese oxide can achieve a higher stability and higher activity compared with that of other forms of manganese oxide. The higher stability can lead to longer life of a catalyst or air cathode made from the mixture of hausmannite and cation intercalated manganese oxide compared with a catalyst or air cathode made from other forms of manganese oxide.

The mixture of hausmannite and cation intercalated manganese oxide can be prepared with carbon. For example, carbon can be added to the mixture of hausmannite and cation intercalated manganese oxide. The carbon can increase the conductivity between the components in the catalyst. For example, the carbon can increase the bonding between the hausmannite and cation intercalated manganese oxide. The carbon can increase the bonding between the hausmannite and potassium intercalated manganese oxide.

The apparatus can include the cathode membrane 115 for a power source (e.g., power source component). The cathode membrane 115 can include the current collector 105. The current collector 105 can include the porous substrate. The cathode membrane 115 can include the active layer 120 (e.g., the layer that coats the porous substrate) to provide a catalyst for the cathode membrane 115. The cathode membrane 115 can include the layer formed from a mixture of hausmannite and cation intercalated manganese oxide. The apparatus can include the power source. The apparatus can include an anode of the power source. The power source can be configured to store and provide energy.

Figure 2:
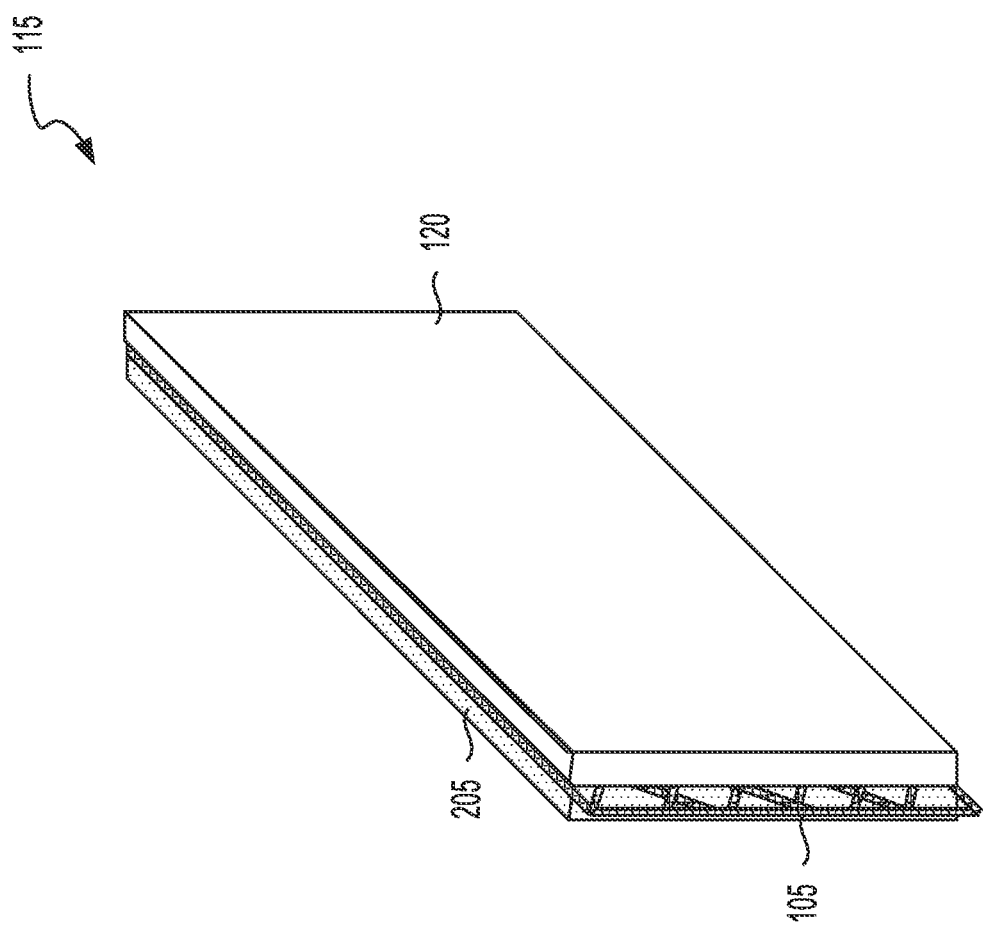
FIG. 2 illustrates a cathode membrane according to an example implementation.

FIG. 2 illustrates the cathode membrane 115 (e.g., air cathode, laminated air cathode, laminated air cathode architecture, etc.). The cathode membrane 115 can include a layer (e.g., active layer 120, active layer coating, etc.) that coats the porous substrate. The active layer 120 can coat the porous substrate to provide a catalyst for the cathode membrane 115. The active layer 120 can coat the current collector 105 (e.g., current collector mesh) to provide a catalyst for the cathode membrane 115. The active layer 120 can coat the current collector 105 with the hydrophobic mass 110 to provide a catalyst for the cathode membrane 115. The active layer 120 can coat the current collector 105 impregnated with the hydrophobic mass 110 to provide a catalyst for the cathode membrane 115. The current collector 105 impregnated with the hydrophobic mass 110 and coated with the active layer 120 can be known as an air cathode or an impregnated air cathode. The active layer 120 can include an active mass or active mass slurry. The active layer 120 can act as or be a catalyst for the ORR.

The active layer 120 can be formed from a mixture of hausmannite and cation intercalated manganese oxide. The catalyst can be formed from a mixture of hausmannite and cation intercalated manganese oxide. The hausmannite contained in the catalyst can be in a range of 10 wt % to 90 wt % (e.g., 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, inclusive). The cation intercalated manganese oxide can include potassium intercalated manganese oxide. The potassium intercalated manganese oxide contained in the catalyst can be in a range of 10 wt % to 90 wt % (e.g., 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, inclusive). The mixture of hausmannite and cation intercalated manganese oxide can be used as a catalyst for an air cathodes. The mixture of hausmannite and cation intercalated manganese oxide can be used in at least one of capacitors, batteries, or other types of energy conversion or storage systems. The mixture of hausmannite and cation intercalated manganese oxide can act as or be a catalyst for the ORR.

The hausmannite can include $Mn_3O_4$. The oxidation state of the manganese in hausmannite can be between +2 and +3. The hausmannite can exist in a spinel structure. For example, the hausmannite can exist in a spinel structure between $Mn^{2+}$ and $Mn^{3+}$. The hausmannite can have a higher stability and higher or comparable activity than that of other forms of manganese oxide (e.g., Mn(IV) oxides). $Mn_3O_4$ can be synthesized using a reducing agent. $Mn_3O_4$ can be synthesized using a reducing agent with two or fewer carbon atoms (e.g., sodium formate, ethanol, etc.). $Mn_3O_4$ can be synthesized using a reducing agent which has fewer carbons per molecule (e.g., 2 or less).

The cation intercalated manganese oxide can include potassium intercalated manganese oxide. The mixture of hausmannite and cation intercalated manganese oxide can have a higher stability and higher activity compared with that of other forms of manganese oxide. The potassium intercalated manganese oxide can include $KMn_4O_{16}$. The manganese oxide without cation intercalation or potassium intercalation can have a crystal structure that includes open tunnels (e.g., open spaces, open pores, etc.). During the ORR, the open tunnels can collapse due to the changing oxidation state of the manganese. The cations (e.g., potassium ions, sodium ions, calcium ions, lithium ions, magnesium ions, iron irons, zinc ions, etc.) located in the tunnels can prevent the manganese oxide from collapsing by providing support to the manganese oxide. The cations (e.g., potassium ions) located in the tunnels can prevent the collapsing of the pores during the ORR. The cation intercalated manganese oxide can include cation-filled tunnels (e.g., tunnels filled with cations). The potassium intercalated manganese oxide can include potassium ion-filled tunnels (e.g., tunnels filled with potassium ions). The layer or active layer 120 can include potassium ions stacked in tunnels. For example, the potassium ions can fill the tunnels of the manganese oxide. Intercalation of cations in the tunnels of the manganese oxide can provide physical stability to the catalyst matrix. Intercalation of cations in the layers between the octahedral manganese oxide structures can provide physical stability to the catalyst matrix. In cation intercalated manganese oxide, the cations (e.g., potassium ions) can distort the crystal structure of the manganese oxide. This distortion can lead to slightly higher activity (compared with non-intercalated manganese oxide) due to reduced bond strength between lattice sites of the manganese oxide. The potassium intercalated manganese oxide can be synthesized using potassium permanganate as an oxidizing agent.

The mixture of hausmannite and cation intercalated manganese oxide can provide a variety of benefits. For example, the $Mn_3O_4$ can exhibit higher resistance to reduction in oxidation state because the $Mn_3O_4$ exists as a spinel like structure with an equilibrium between $Mn^{2+}$ and $Mn^{3+}$. $Mn_3O_4$ can have a comparable activity to $MnO_2$. Potassium intercalated manganese oxide can add further stability to the catalyst and can prevent physical degradation of the catalyst. The mixture of hausmannite and cation intercalated manganese oxide can achieve a higher stability and higher activity compared with that of other forms of manganese oxide. The higher stability can lead to longer life of a catalyst or air cathode made from the mixture of hausmannite and cation intercalated manganese oxide compared with a catalyst or air cathode made from other forms of manganese oxide.

The mixture of hausmannite and cation intercalated manganese oxide can be prepared with carbon. For example, carbon can be added to the mixture of hausmannite and cation intercalated manganese oxide. The carbon can increase the bonding between the components in the catalyst. For example, the carbon can increase the conductivity between the hausmannite and cation intercalated manganese oxide. The carbon can increase the bonding between the hausmannite and potassium intercalated manganese oxide.

The apparatus can include a backing layer 205. The backing layer 205 can be coupled to (e.g., coupled with, connected to, etc.) the current collector 105. For example, the backing layer 205 can be coupled to the current collector 105 on a side of the current collector 105 opposite the layer that coats the porous substrate. The backing layer 205 can be coupled to the current collector 105 on a side of the current collector 105 opposite the active layer 120. The backing layer 205 can be coupled to the current collector mesh on a side of the current collector mesh opposite the active layer 120. The current collector 105 can include a mesh (e.g., nickel mesh, copper mesh, silver mesh, metal mesh, metal alloy mesh, etc.). The current collector 105 can include a mesh structure. For example, the mesh structure can include at least one of nickel, copper, or silver. The laminated air cathode can include the current collector mesh (e.g., current collector 105) sandwiched between the active layer 120 and the backing layer 205. The backing layer 205 can be hydrophobic.

The backing layer 205 can be laminated together with the current collector 105 and the layer that coats the porous substrate to form the cathode membrane 115. The backing layer 205 can be laminated together with the current collector 105 and the layer that coats the porous substrate to form the air cathode. The backing layer 205 can be laminated together with the current collector 105 and the active layer 120 to form the cathode membrane 115. The backing layer 205 can be laminated together with the current collector 105 and the active layer 120 to form the air cathode. For example, the backing layer 205 can be attached to the current collector 105. The backing layer 205 can be attached to the current collector mesh.

The apparatus can include the cathode membrane 115 for a power source. The cathode membrane 115 can include the current collector 105. The current collector 105 can include the porous substrate. The cathode membrane 115 can include the active layer 120 (e.g., the layer that coats the porous substrate) to provide a catalyst for the cathode membrane 115. The cathode membrane 115 can include the layer formed from a mixture of hausmannite and cation intercalated manganese oxide. The apparatus can include the power source. The apparatus can include an anode of the power source. The power source can be configured to store and provide energy.

Figure 3:
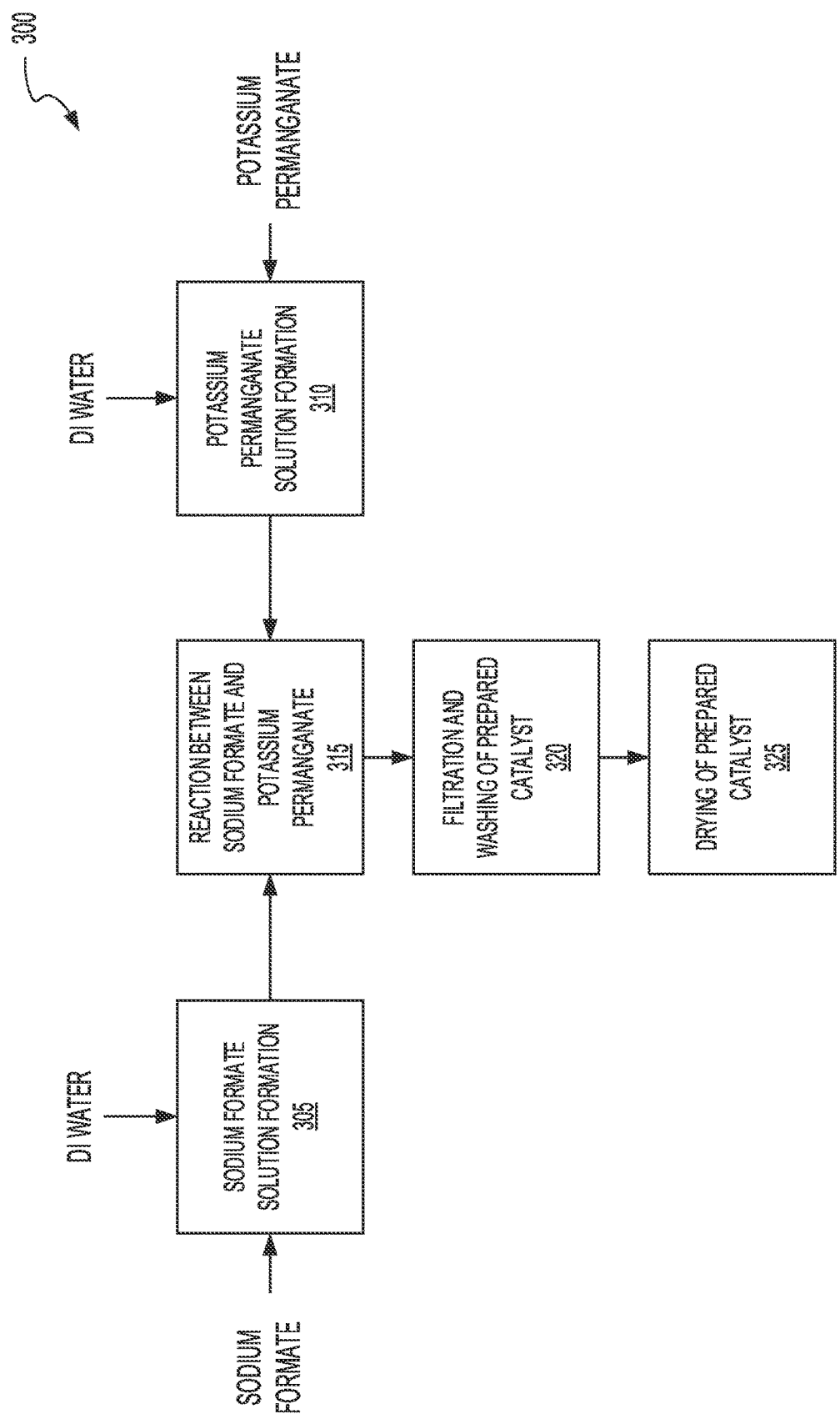
FIG. 3 illustrates a method of catalyst powder synthesis according to an example implementation.

FIG. 3 illustrates a method 300 of catalyst powder synthesis. In brief summary, the method 300 can include forming a sodium formate solution (BLOCK 305). The method 300 can include forming a potassium permanganate solution (BLOCK 310). The method 300 can include reacting the sodium formate solution and potassium permanganate solution (BLOCK 315). The method 300 can include filtering and washing the catalyst (BLOCK 320). The method 300 can include drying the catalyst (BLOCK 325).

The method 300 can include forming a sodium formate solution (BLOCK 305). For example, forming the sodium formate solution can include mixing sodium formate powder with deionized water (e.g., DI water). The sodium formate solution can be in a range of 1.0 molar to 2 molar (e.g., 1.0 molar, 1.1 molar, 1.2 molar, 1.3 molar, 1.4 molar, 1.5 molar, 1.6 molar, 1.7 molar, 1.8 molar, 1.9 molar, or 2.0 molar, inclusive). The sodium formate powder can be mixed with DI water at room temperature (e.g., 20° C., 21° C., 22° C., inclusive). The sodium formate powder can be mixed with DI water until the sodium formate powder is dissolved. For example, the sodium formate powder can be mixed with DI water for a time period of 1 minute, 2 minutes, 5 minutes, 10 minutes, or 15 minutes.

The method 300 can include forming a potassium permanganate solution (BLOCK 310). For example, forming the potassium permanganate solution can include mixing potassium permanganate powder with DI water. The potassium permanganate solution can be in a range of 0.1 molar to 1 molar (e.g., 0.1 molar, 0.2 molar, 0.3 molar, 0.4 molar, 0.5 molar, 0.6, molar, 0.7 molar, 0.8 molar, 0.9 molar, or 1.0 molar, inclusive). The potassium permanganate powder can be mixed with DI water at a temperature in a range of 20° C. to 40° C. (e.g., 20° C., 25° C., 30° C., 35° C., or 40° C., inclusive). The potassium permanganate powder can be mixed with DI water until the potassium permanganate powder is dissolved. For example, the potassium permanganate powder can be mixed with DI water for a first time period of 15 minutes, 30 minutes, 45 minutes, 1 hour, 2 hours, or 3 hours at the temperature. The potassium permanganate powder can be mixed with DI water for a second time period of 30 minutes, 45 minutes, 1 hour, 2 hours, 3 hours, or 4 hours without any heat. For example, the potassium permanganate powder can be mixed with DI water for the second time period at room temperature (e.g., 20° C., 21° C., 22° C., inclusive).

The method 300 can include reacting the sodium formate solution and potassium permanganate solution (BLOCK 315). Reacting the sodium formate solution and potassium permanganate solution can form hausmannite and potassium intercalated manganese oxide (e.g., the hausmannite and potassium intercalated manganese oxide complex). The synthesis of hausmannite and potassium intercalated manganese oxide can occur through the reaction of the sodium formate solution and potassium permanganate solution. The hausmannite and potassium intercalated manganese oxide complex can be made by mixing the potassium permanganate solution and the sodium formate solution. The volume by volume ratio of potassium permanganate solution to sodium formate solution can be in a range of 1 to 3 (e.g., 1, 1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, inclusive). The potassium permanganate solution can be added to sodium formate solution while stirring intermittently. The average rate of addition potassium permanganate solution to the sodium formate solution can be in a range of 1.0 mL/sec to 1.5 mL/sec (e.g., 1.1 mL/sec, 1.2 mL/sec, 1.3 mL/sec, 1.4 mL/sec, or 1.5 mL/sec, inclusive). After the entire potassium permanganate solution is added, the solution can be mixed to achieve reaction completion. For example, the solution can be mixed for time period 5 minutes, 10 minutes, 15 minutes, or 20 minutes.

The method 300 can include filtering and washing the catalyst (BLOCK 320). Filtering can occur via vacuum assisted filtration. The vacuum assisted filtration can be carried out using a Buchner funnel. Filter paper can be used for filtration. The filter paper can have a mesh size in a range of 300 mesh to 500 mesh (e.g., 300 mesh, 325 mesh, 350 mesh, 375 mesh, 400 mesh, 425 mesh, 450 mesh, 475 mesh, or 500 mesh, inclusive). The residue (e.g., filter cake, solid reside, etc.) can be washed with DI water 1 time, 2 times, 3 times, 4 times, or 5 times to produce a washed filter cake.

The method 300 can include drying the catalyst (BLOCK 325). The washed filter cake can be dried at a temperature in a range of 80° C. to 100° C. (e.g., 80° C., 85° C., 90° C., 95° C., or 100° C., inclusive) for a time period in a range of 1 hour to 5 hours (e.g., 1 hour, 2 hours, 3 hours, 4 hours, or 5 hours, inclusive).

Figure 4:
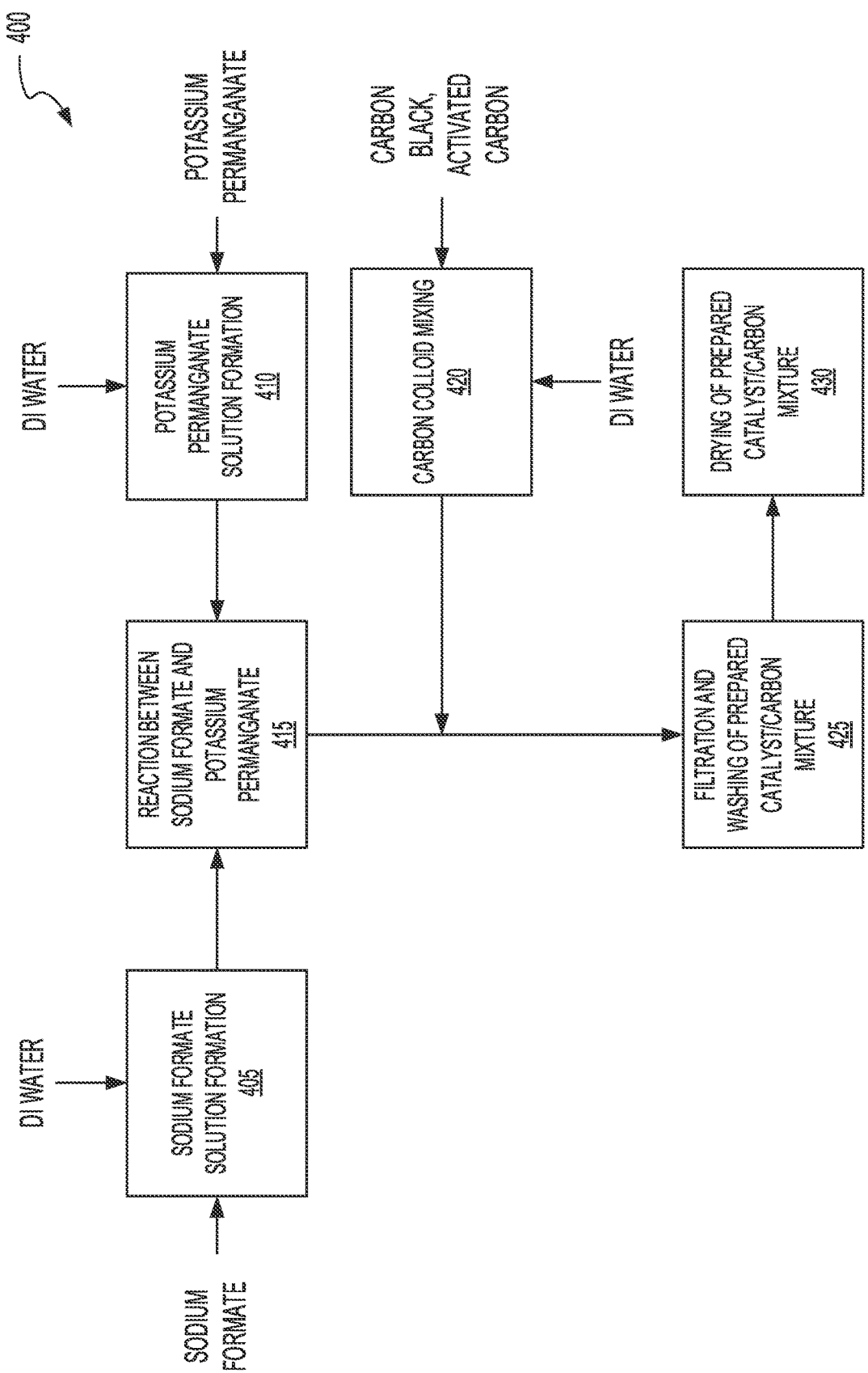
FIG. 4 illustrates a method of carbon and catalyst powder synthesis according to an example implementation.

FIG. 4 illustrates a method 400 of carbon and catalyst powder synthesis. In brief summary, the method 400 can include forming a sodium formate solution (BLOCK 405). The method 400 can include forming a potassium permanganate solution (BLOCK 410). The method 400 can include reacting the sodium formate solution and potassium permanganate solution (BLOCK 415). The method 400 can include mixing a carbon colloid (BLOCK 420). The method 400 can include filtering and washing the catalyst (BLOCK 425). The method 400 can include drying the catalyst (BLOCK 430).

The method 400 can include forming a sodium formate solution (BLOCK 405). For example, forming the sodium formate solution can include mixing sodium formate powder with deionized water (e.g., DI water). The sodium formate solution can be in a range of 1.0 molar to 2 molar (e.g., 1.0 molar, 1.1 molar, 1.2 molar, 1.3 molar, 1.4 molar, 1.5 molar, 1.6 molar, 1.7 molar, 1.8 molar, 1.9 molar, or 2.0 molar, inclusive). The sodium formate powder can be mixed with DI water at room temperature (e.g., 20° C., 21° C., 22° C., inclusive). The sodium formate powder can be mixed with DI water until the sodium formate powder is dissolved. For example, the sodium formate powder can be mixed with DI water for a time period of 1 minute, 2 minutes, 5 minutes, 10 minutes, or 15 minutes.

The method 400 can include forming a potassium permanganate solution (BLOCK 410). For example, forming the potassium permanganate solution can include mixing potassium permanganate powder with DI water. The potassium permanganate solution can be in a range of 0.1 molar to 1 molar (e.g., 0.1 molar, 0.2 molar, 0.3 molar, 0.4 molar, 0.5 molar, 0.6, molar, 0.7 molar, 0.8 molar, 0.9 molar, or 1.0 molar, inclusive). The potassium permanganate powder can be mixed with DI water at a temperature in a range of 20° C. to 40° C. (e.g., 20° C., 25° C., 30° C., 35° C., or 40° C., inclusive). The potassium permanganate powder can be mixed with DI water until the potassium permanganate powder is dissolved. For example, the potassium permanganate powder can be mixed with DI water for a first time period of 15 minutes, 30 minutes, 45 minutes, 1 hour, 2 hours, or 3 hours at the temperature. The potassium permanganate powder can be mixed with DI water for a second time period of 30 minutes, 45 minutes, 1 hour, 2 hours, 3 hours, or 4 hours without any heat. For example, the potassium permanganate powder can be mixed with DI water for the second time period at room temperature (e.g., 20° C., 21° C., 22° C., inclusive).

The method 400 can include reacting the sodium formate solution and potassium permanganate solution (BLOCK 415). Reacting the sodium formate solution and potassium permanganate solution can form hausmannite and potassium intercalated manganese oxide (e.g., the hausmannite and potassium intercalated manganese oxide complex). Reacting the sodium formate solution and potassium permanganate solution can be for the synthesis of the catalyst. The synthesis of hausmannite and potassium intercalated manganese oxide can occur through the reaction of the sodium formate solution and potassium permanganate solution. The hausmannite and potassium intercalated manganese oxide complex can be made by mixing the potassium permanganate solution and the sodium formate solution. The volume by volume ratio of potassium permanganate solution to sodium formate solution can be in a range of 1 to 3 (e.g., 1, 1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, inclusive). The potassium permanganate solution can be added to sodium formate solution while stirring intermittently. The average rate of addition potassium permanganate solution to the sodium formate solution as a volume ratio can be in a range of 1.0 mL/sec to 1.5 mL/sec (e.g., 1.1 mL/sec, 1.2 mL/sec, 1.3 mL/sec, 1.4 mL/sec, or 1.5 mL/sec, inclusive). The average rate of addition potassium permanganate solution to the sodium formate solution can be in a range of 0.1%/sec to 3%/sec (e.g., 0.1%/sec, 0.5%/sec, 1.0%/sec, or 1.5%/sec, inclusive). After the entire potassium permanganate solution is added, the solution can be mixed to achieve reaction completion. For example, the solution can be mixed for time period 5 minutes, 10 minutes, 15 minutes, or 20 minutes.

The method 400 can include mixing a carbon colloid (BLOCK 420). The carbon colloid can include a carbon slurry. Mixing a carbon colloid can include forming a carbon slurry. Mixing the carbon colloid can include suspending carbon (e.g., a mixture of Black Pearl 2000 and Norit S 1 XG) in DI water. The carbon can include carbon black. The carbon can include activated carbon. The mass to volume ratio for carbon to DI water can be in a range of 0.1 to 0.5 (e.g., 0.1, 0.2, 0.3, 0.4, or 0.5, inclusive). The carbon suspended in DI water can include a carbon slurry. The carbon slurry can be stirred at a rate in a range of 500 rpm to 1000 rpm (e.g., 500 rpm, 600 rpm, 700 rpm, 800 rpm, 900 rpm, or 1000 rpm, inclusive) for a time period in a range of 5 minutes to 1 hour (e.g., 5 minutes, 10 minutes, 20 minutes, 30 minutes, 40 minutes, 50 minutes, or 1 hour, inclusive) to form a carbon suspension.

The solution from the reaction of the sodium formate solution and potassium permanganate solution can be poured into the carbon suspension. The volume by volume ratio of reacted solution of sodium formate solution and potassium permanganate to carbon suspension can be in a range of 0.5 to 1.5 (e.g., 0.5, 0.6, 0.7, 0.8, 0.9, 1.0, 1.1, 1.2, 1.3, 1.4, or 1.5, inclusive). During the addition of reacted solution to the carbon suspension, the stirring can be at a rate in a range of 500 rpm to 1000 rpm (e.g., 500 rpm, 600 rpm, 700 rpm, 800 rpm, 900 rpm, or 1000 rpm, inclusive). After addition of the reacted solution to the carbon suspension, the stirring can be at a rate in a range of 700 rpm to 1200 rpm (e.g., 700 rpm, 800 rpm, 900 rpm, 1000 rpm, 1100 rpm, or 1200 rpm, inclusive) for a time period in a range of 5 minutes to 1 hour (e.g., 5 minutes, 10 minutes, 20 minutes, 30 minutes, 40 minutes, 50 minutes, or 1 hour, inclusive) to form the catalyst.

The method 400 can include filtering and washing the catalyst (BLOCK 425). Filtering can occur via vacuum assisted filtration. The vacuum assisted filtration can be carried out using a Buchner funnel. Filter paper can be used for filtration. The filter paper can have a mesh size in a range of 300 mesh to 500 mesh (e.g., 300 mesh, 325 mesh, 350 mesh, 375 mesh, 400 mesh, 425 mesh, 450 mesh, 475 mesh, or 500 mesh, inclusive). The residue (e.g., filter cake, solid reside, etc.) can be washed with DI water 1 time, 2 times, 3 times, 4 times, or 5 times to produce a washed filter cake. The catalyst can include the catalyst/carbon mixture (e.g., catalyst/carbon powder).

The method 400 can include drying the catalyst (BLOCK 430). The washed filter cake can be dried at a temperature in a range of 80° C. to 100° C. (e.g., 80° C., 85° C., 90° C., 95° C., or 100° C., inclusive) for a time period in a range of 1 hour to 5 hours (e.g., 1 hour, 2 hours, 3 hours, 4 hours, or 5 hours, inclusive). The catalyst can include the catalyst/carbon mixture (e.g., catalyst/carbon powder). The catalyst can include particles of the catalyst/carbon mixture. The particles can have a length in a range of 150 nanometers to 800 nanometers (e.g., 150 nanometers, 200 nanometers, 250 nanometers, 300 nanometers, 350 nanometers, 400 nanometers, 450 nanometers, 500 nanometers, 550 nanometers, 600 nanometers, 650 nanometers, 700 nanometers, 750 nanometers, or 800 nanometers, inclusive). The particles can have a width in a range of 150 nanometers to 800 nanometers (e.g., 150 nanometers, 200 nanometers, 250 nanometers, 300 nanometers, 350 nanometers, 400 nanometers, 450 nanometers, 500 nanometers, 550 nanometers, 600 nanometers, 650 nanometers, 700 nanometers, 750 nanometers, or 800 nanometers, inclusive).

Figure 5:
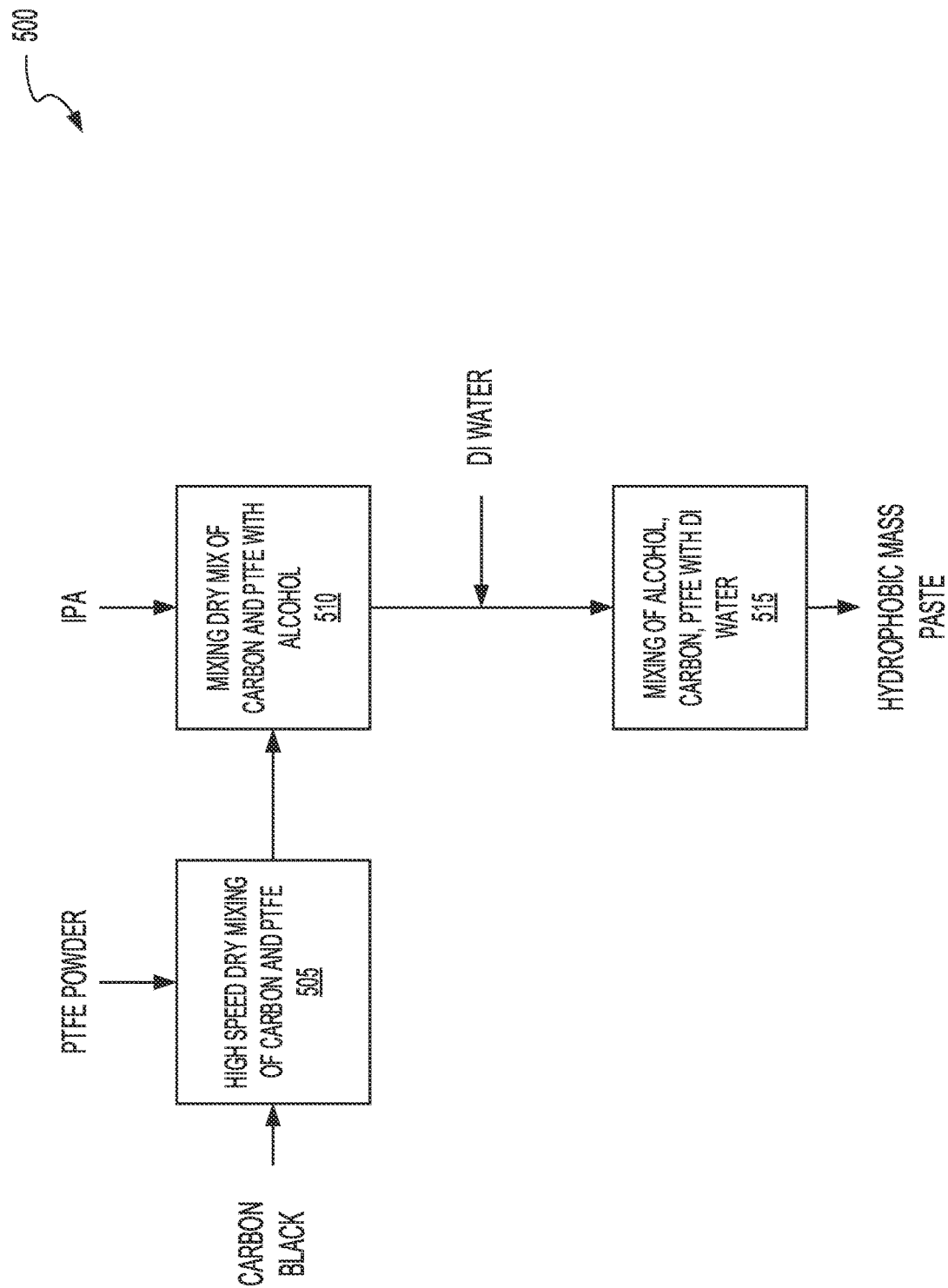
FIG. 5 illustrates a method of hydrophobic mass synthesis according to an example implementation.

FIG. 5 illustrates a method 500 of hydrophobic mass synthesis. In brief summary, the method 500 can include dry mixing of carbon and PTFE (BLOCK 505). The method 500 can include mixing the mixture of carbon and PTFE with an alcohol (BLOCK 510). The method 500 can include mixing the mixture of carbon, PTFE, and alcohol with DI water (BLOCK 515).

The method 500 can include dry mixing of carbon and PTFE (BLOCK 505). Dry mixing of carbon and PTFE can include mixing carbon (e.g. Vulcan XC 72) and PTFE micro powder (e.g. Zonyl MP 1100) for a time period in a range of 1 minute to 15 minutes (e.g., 1 minute, 2 minutes, 5 minutes, 10 minutes, or 15 minutes, inclusive). The mass-to-mass ratio of carbon to PTFE resin can be in a range of 0.1 to 1.0 (e.g., 0.1, 0.2, 0.3, 0.4, 0.5, 0.6, 0.7, 0.8, 0.9, or 1.0, inclusive). Dry mixing of carbon and PTFE can form a carbon and PTFE powder. Dry mixing of carbon and PTFE can include mixing carbon and PTFE without a solvent.

The method 500 can include mixing the mixture of carbon and PTFE with an alcohol (BLOCK 510). The alcohol can include isopropyl alcohol (IPA). The method 500 can include mixing the mixture of carbon and PTFE with IPA for a time period in a range of 10 seconds to 1 minute (e.g., 10 seconds, 20 seconds, 30 seconds, 40 seconds, 50 seconds, or 1 minute, inclusive). The mass to volume (grams to mL) ratio of dry powder (e.g., carbon and PTFE powder) to alcohol can be in a range of 1 to 5 (e.g., 1, 2, 3, 4, or 5, inclusive). Mixing the mixture of carbon and PTFE with the alcohol (e.g., IPA) can form a wet mixture.

The method 500 can include mixing the mixture of carbon, PTFE, and alcohol with DI water (BLOCK 515). DI water can be added and mixed with the wet mixture of carbon, PTFE, and IPA. The DI water can be mixed with the wet mixture for a time period in a range of 15 minutes to 2 hours (e.g., 15 minutes, 30 minutes, 45 minutes, 1 hour, or 2 hours, inclusive). The volume-to-volume ratio of DI water to wet mixture to can be in a range of 5 to 15 (e.g. 5, 7, 9, 11, 13, or 15, inclusive). Mixing the mixture of carbon, PTFE, and alcohol with DI water can produce the hydrophobic mass (e.g., hydrophobic mass paste). The hydrophobic mass paste can impregnate the current collector (e.g., nickel foam). For example, the hydrophobic mass paste can go inside pores of the nickel foam.

Figure 6:
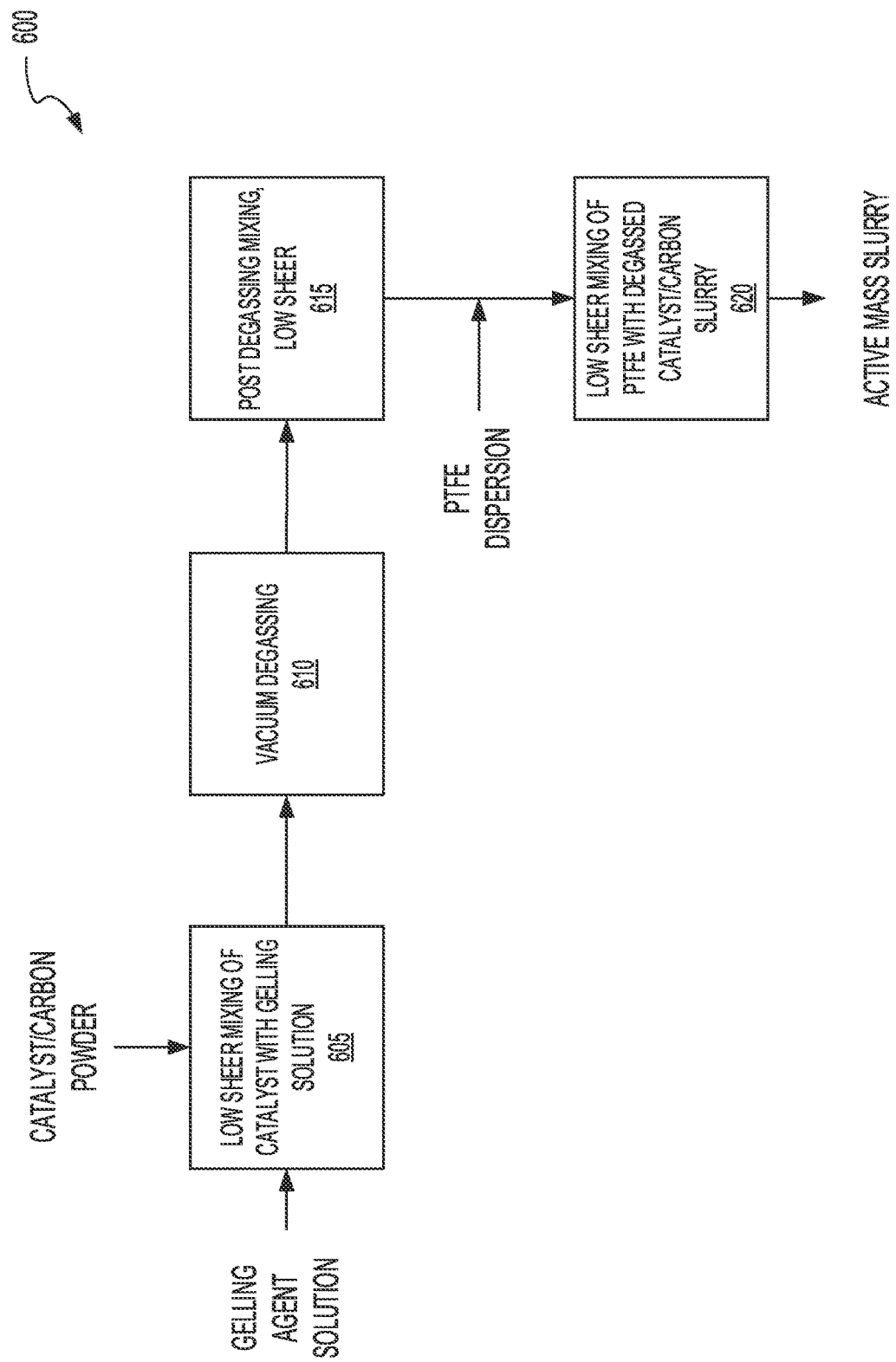
FIG. 6 illustrates a method of active mass slurry synthesis according to an example implementation.

FIG. 6 illustrates a method 600 of active mass slurry synthesis. In brief summary, the method 600 can include gelation of the catalyst/carbon powder (BLOCK 605). The method 600 can include vacuum degassing (BLOCK 610). The method 600 can include post degassing mixing (BLOCK 615). The method 600 can include mixing PTFE with the degassed catalyst/carbon slurry (BLOCK 620).

The method 600 can include gelation of the catalyst/carbon powder (BLOCK 605). The gelation of the catalyst/carbon powder can include gelation of the catalyst/carbon powder (e.g., active powder) produced in FIG. 4. The active powder can be mixed with a gelling solution (e.g., gelling agent solution). The gelling solution can include 0.5% by weight carboxymethyl cellulose solution. The active powder can be mixed with the gelling solution for a time period in a range of 1 minute to 10 minutes (e.g., 1 minute, 2 minutes, 3 minutes, 4 minutes, 5 minutes, 6 minutes, 7 minutes, 8 minutes, 9 minutes, or 10 minutes, inclusive). The mixing can be low sheer mixing. The mass-to-mass ratio for the gelling solution and catalyst/carbon powder can be in a range of 1 to 5 (e.g., 1, 2, 3, 4, or 5, inclusive). The active powder can be mixed with the gelling solution to produce a gelled active powder mixture.

The method 600 can include vacuum degassing (BLOCK 610). The gelled active powder mixture can be de-gassed. For example, the gelled active powder mixture can be de-gassed in a vacuum of −29.5 in Hg. The vacuum degassing can occur after gelation of the catalyst/carbon powder. The vacuum degassing can occur after mixing of the gelling agent solution with the catalyst/carbon powder. The vacuum degassing can remove air bubbles from the mixture or prevent air bubble formation.

The method 600 can include post degassing mixing (BLOCK 615). The de-gassed mixture can be mixed. The mixing can be low sheer mixing. The post degassing mixing can occur after vacuum degassing. The post degassing mixing can produce the degassed catalyst/carbon slurry.

The method 600 can include mixing PTFE with the degassed catalyst/carbon slurry (BLOCK 620). PTFE (e.g., PTFE dispersion, Duponts eT30 with a 60 wt % solid loading, etc.) can be added to the degassed catalyst/carbon slurry. The PTFE can be added to the degassed catalyst/carbon slurry over a time period in a range of 10 minutes to 1 hour (e.g., 10 minutes, 20 minutes, 30 minutes, 40 minutes, 50 minutes, or 1 hour, inclusive). The mass-to-mass ratio for degassed catalyst/carbon slurry and PTFE dispersion can be in a range of 5 to 15 (e.g., 5, 6, 7, 8, 9, 10, 11, 12, 13, 14, or 15, inclusive). After the PTFE dispersion is added to the degassed catalyst/carbon slurry, the resulting mixture can undergo mixing for a time period in a range of 1 minute to 20 minutes (e.g., 1 minute, 2 minutes, 5 minutes, 10 minutes, 15 minutes, or 20 minutes, inclusive). Mixing the PTFE with the degassed catalyst/carbon slurry can produce an active mass slurry. The active mass slurry can form the active layer 120. The active mass slurry can coat the current collector 105. For example, the active mass slurry can coat the impregnated nickel foam.

Figure 7:
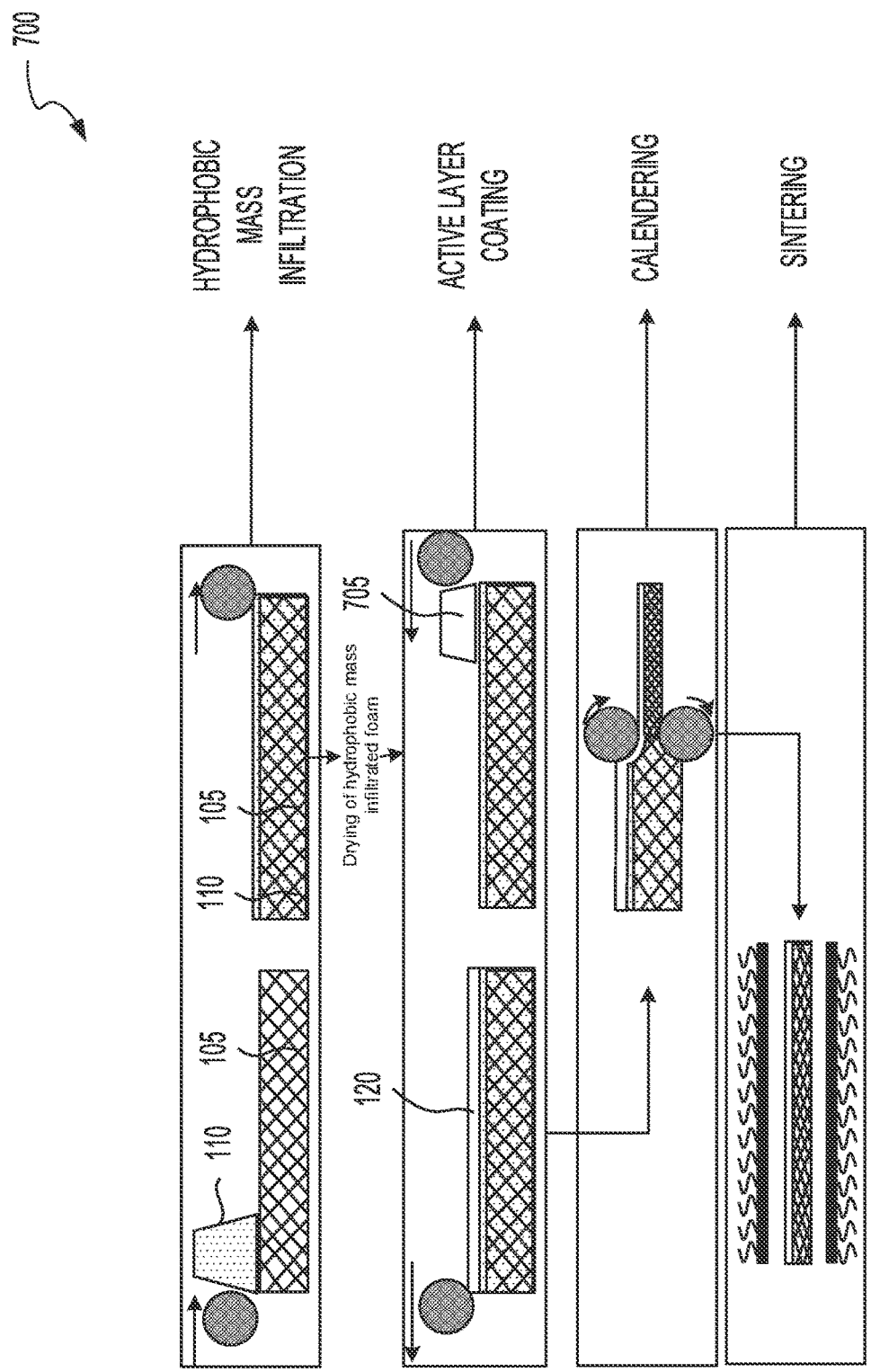
FIG. 7 illustrates a method of air cathode fabrication according to an example implementation.

FIG. 7 illustrates a method 700 of air cathode fabrication. The method 700 can include infiltrating the current collector

105 with the hydrophobic mass 110 (e.g., hydrophobic mass infiltration) to create a hydrophobic mass infiltrated foam. The method 700 can include drying of the hydrophobic mass infiltrated foam. The method 700 can include coating the hydrophobic mass infiltrated foam with the active layer 120 to create an active layer coated hydrophobic mass infiltrated foam. Coating the hydrophobic mass infiltrated foam with the active layer 120 can include rolling the active mass slurry 705 onto the hydrophobic mass infiltrated foam. Coating the hydrophobic mass infiltrated foam can include coating the hydrophobic mass infiltrated foam after the infiltration process. The method 700 can include calendering. Calendering can include passing the active layer coated hydrophobic mass infiltrated foam through calendering rollers. Calendering can include passing the active layer coated hydrophobic mass infiltrated foam through calendering rollers after the active layer coating process. The method 700 can include sintering. Sintering can include sintering the active layer coated hydrophobic mass infiltrated foam. Sintering can include sintering the active layer coated hydrophobic mass infiltrated foam after the calendering process.

Figure 8:
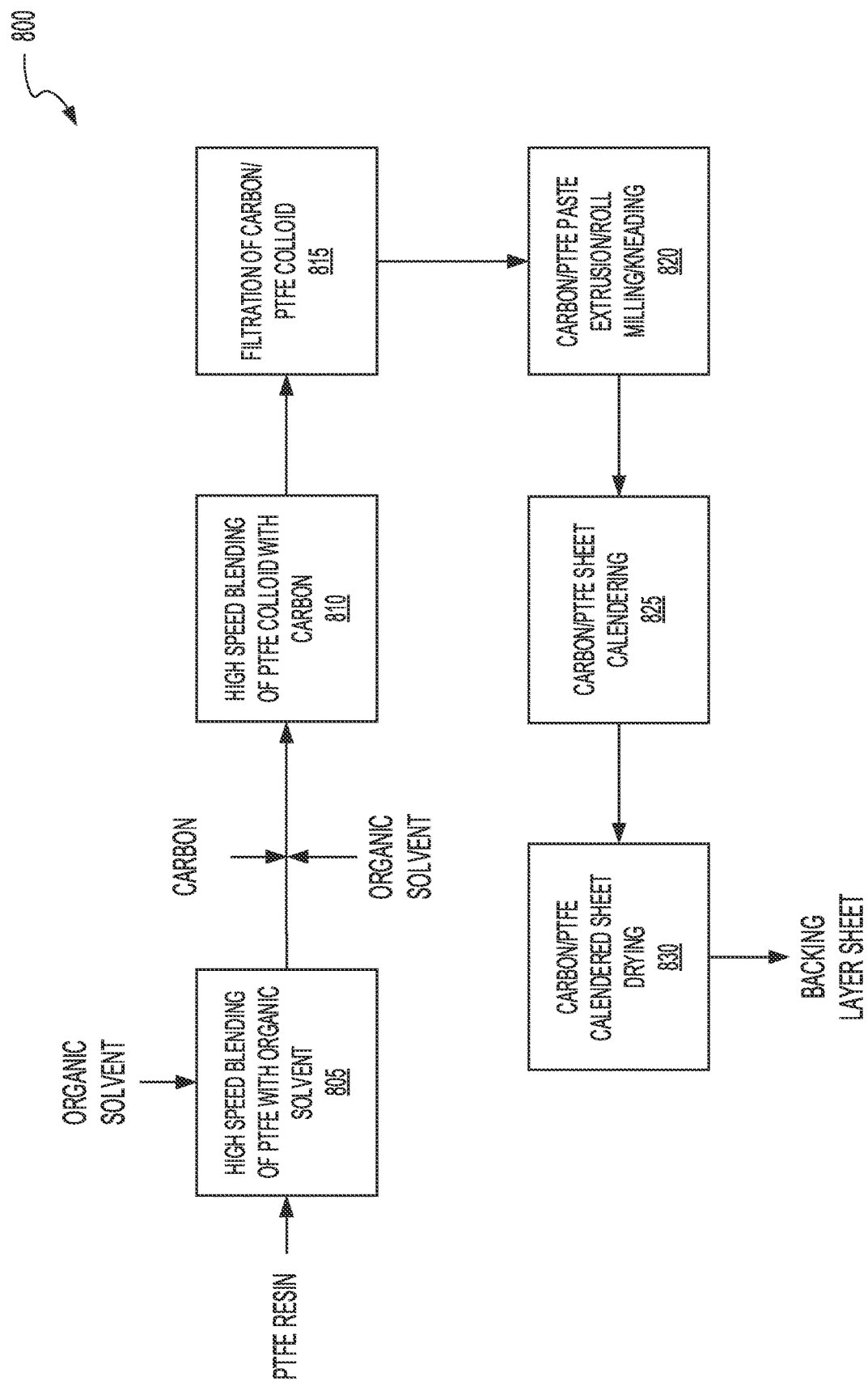
FIG. 8 illustrates a method of air cathode fabrication according to an example implementation.

FIG. 8 illustrates a method 800 of air cathode fabrication. The air cathode can include the laminated air cathode (e.g., press laminated air cathode). The method 800 can include high speed blending 805. The method 800 can include high speed blending 805 of PTFE (e.g., PTFE resin) with an organic solvent (e.g., alcohol, etc.) to form a PTFE colloid. The method 800 can include high speed blending 810. The method 800 can include high speed blending 810 of the PTFE colloid with carbon. The method 800 can include high speed blending 810 of the PTFE colloid with carbon and the organic solvent to form a carbon/PTFE colloid. The method 800 can include filtering the carbon/PTFE colloid 815 to form a filter cake (e.g., carbon/PTFE paste). The method 800 can include processing the filter cake using an extrusion, roll milling, or kneading process 820 to create a carbon/PTFE sheet. The method 800 can include calendering the carbon/PTFE sheet 825 to form a carbon/PTFE calendered sheet. The method 800 can include drying the carbon/PTFE calendered sheet 830 to form a backing layer sheet (e.g., backing layer 205).

Figure 9:
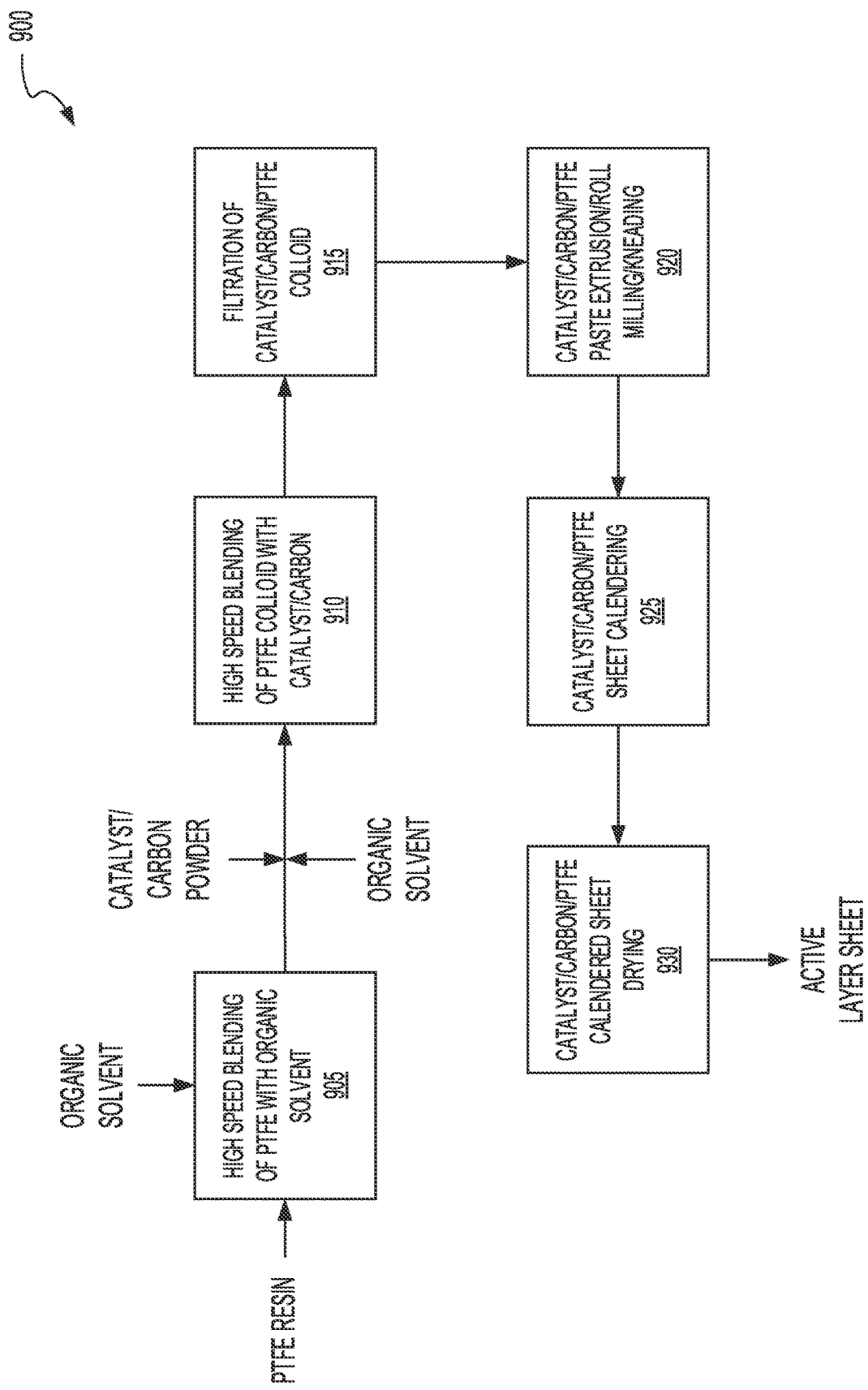
FIG. 9 illustrates a method of air cathode fabrication according to an example implementation.

FIG. 9 illustrates a method of air cathode fabrication. The air cathode can include the laminated air cathode (e.g., press laminated air cathode). The method 900 can include high speed blending 905. The method 900 can include high speed blending 905 of PTFE (e.g., PTFE resin) with an organic solvent (e.g., alcohol, etc.) to form a PTFE colloid. The method 900 can include high speed blending 910. The method 900 can include high speed blending 910 of the PTFE colloid with the catalyst/carbon. The method 900 can include high speed blending 910 of the PTFE colloid with catalyst/carbon and the organic solvent to form a catalyst/carbon/PTFE colloid. The method 900 can include filtering the catalyst/carbon/PTFE colloid 915 to form a filter cake (e.g., catalyst/carbon/PTFE paste). The method 900 can include processing the filter cake using an extrusion, roll milling, or kneading process 920 to create a catalyst/carbon/PTFE sheet. The method 900 can include calendering the catalyst/carbon/PTFE sheet 925 to form a catalyst/carbon/PTFE calendered sheet. The method 900 can include drying the catalyst/carbon/PTFE calendered sheet 930 to form an active layer sheet (e.g., active layer 120).

Figure 10:
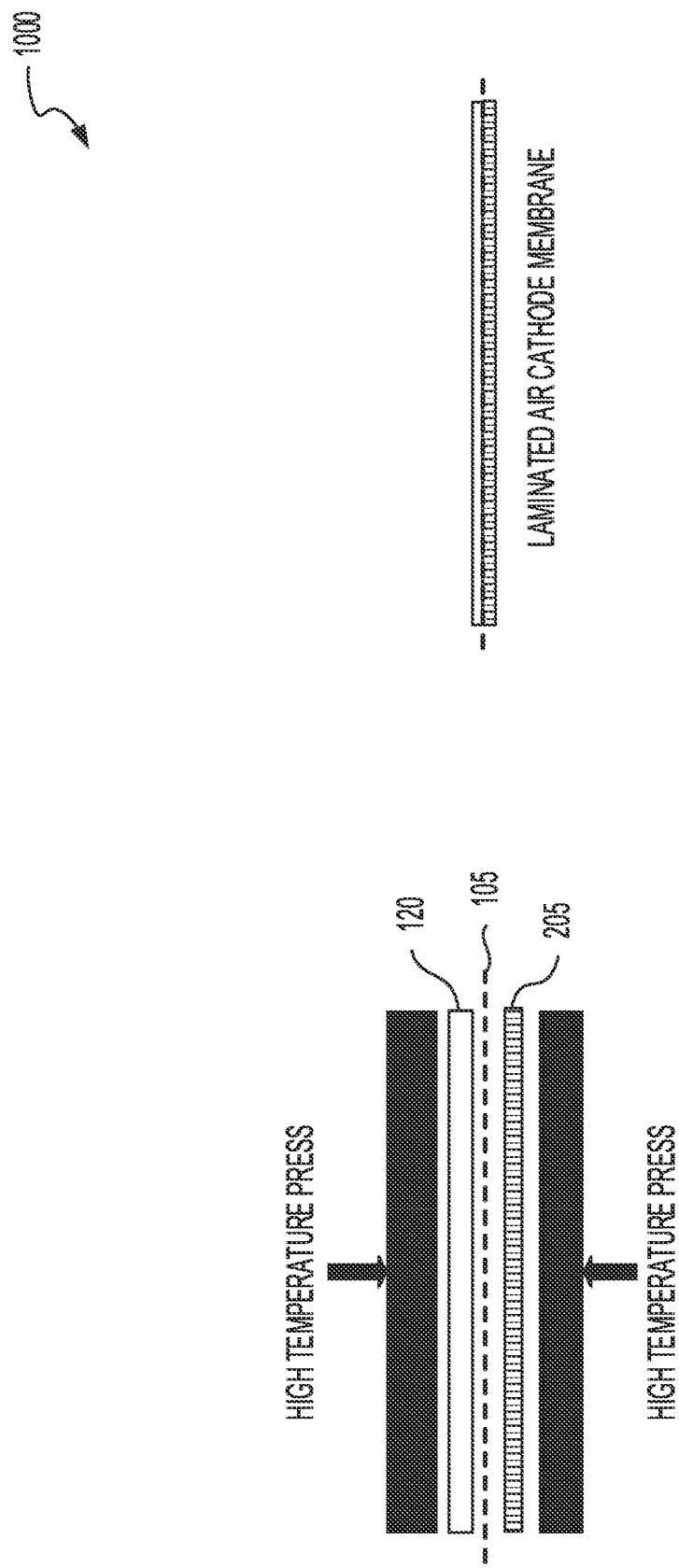
FIG. 10 illustrates a method of air cathode fabrication according to an example implementation.

FIG. 10 illustrates a method 1000 of air cathode fabrication. The air cathode can include the laminated air cathode (e.g., press laminated air cathode). The method 100 can include positioning the active layer 120, the current collector mesh (e.g., current collector 105), and the backing layer 205 between a high temperature press. The current collector mesh can be disposed between the active layer 120 and the backing layer 205. The method 100 can include pressing the active layer 120, the current collector mesh, and the backing layer 205 together at a high temperature to create a press laminated air cathode (e.g., laminated air cathode membrane).

Figure 11:
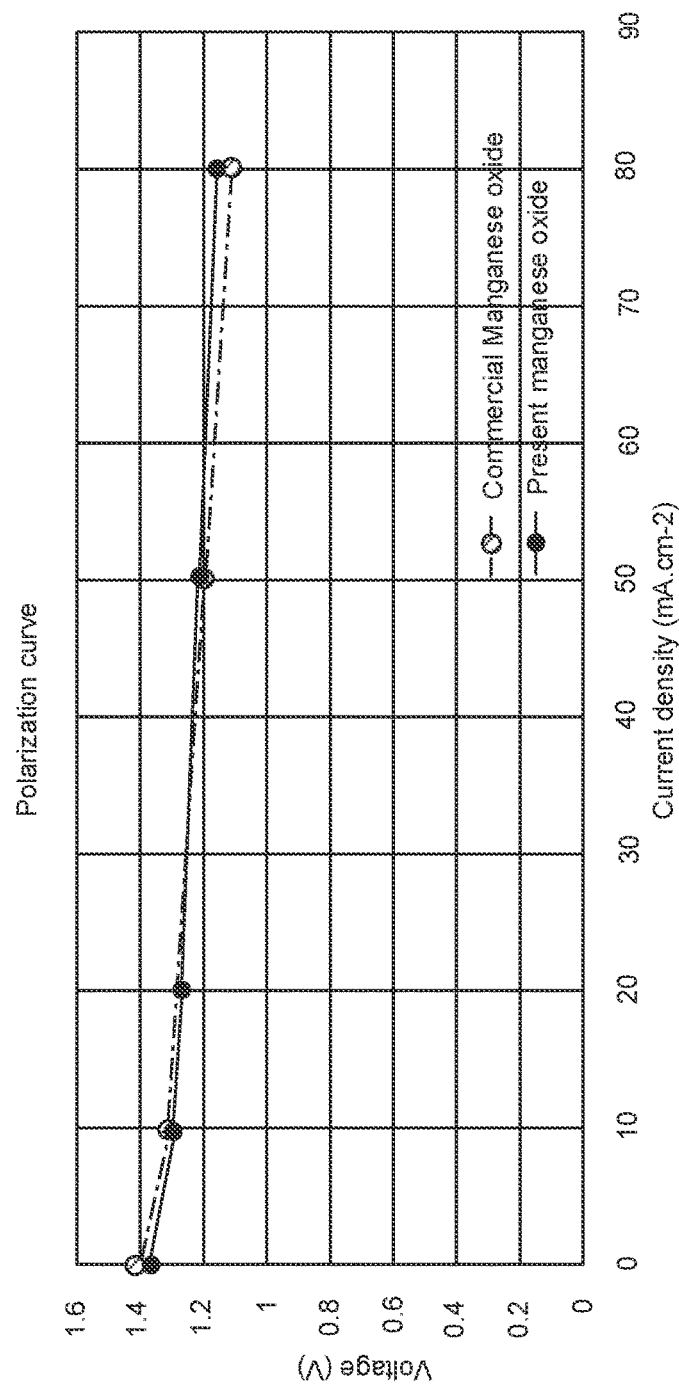
FIG. 11 illustrates a plot of polarization curves for air cathodes according to an example implementation.

FIG. 11 illustrates a plot 1100 of polarization curves for air cathodes. The plot 1100 shows the polarization curves for a commercial manganese oxide (e.g., Electrolytic Manganese Oxide-Tosoh Corporation) and the manganese oxide of the present disclosure (e.g., present manganese oxide, hausmannite and potassium intercalated manganese oxide). The voltage (V) can be plotted against current density (mA/cm$^2$).

Figure 12:
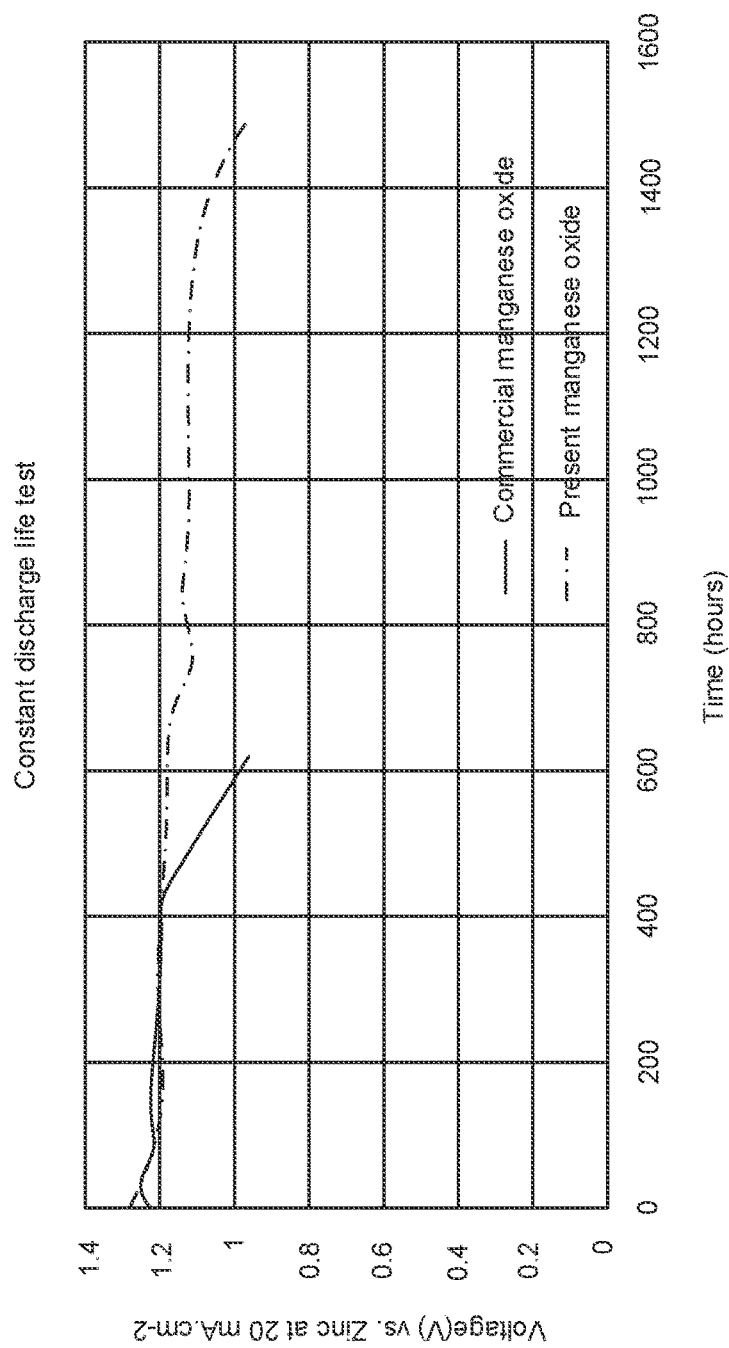
FIG. 12 illustrates a plot of constant discharge life tests for air cathodes according to an example implementation.

FIG. 12 illustrates a plot 1200 of constant discharge life tests for air cathodes. The plot 1200 shows the constant discharge life tests for a commercial manganese oxide (e.g., Electrolytic Manganese Oxide-Tosoh Corporation) and the manganese oxide of the present disclosure (e.g., present manganese oxide, hausmannite and potassium intercalated manganese oxide). The voltage (V) vs. Zinc at 20 mA/cm$^2$ can be plotted against time (hours). The plot shows that an air cathode that includes the manganese oxide of the present disclosure outperforms an air cathode that includes the commercial manganese oxide. For example, the air cathode that includes the manganese oxide of the present disclosure has an improved cycle life compared with that of the air cathode that includes the commercial manganese oxide.

Figure 13:
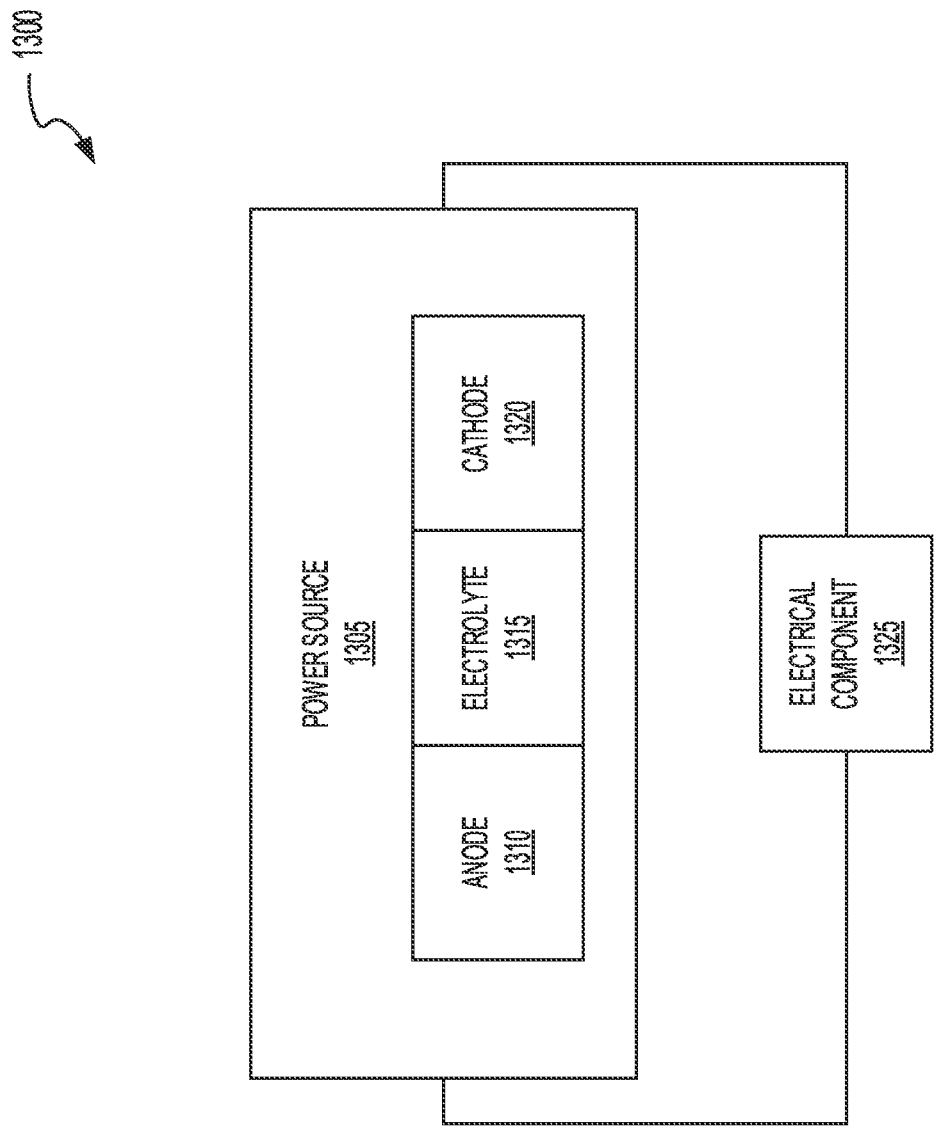
FIG. 13 illustrates an air cathode system according to an example implementation.

FIG. 13 illustrates an air cathode system 1300 (e.g., battery air cathode system). The air cathode system 1300 can include a power source 1305 (e.g., power source component) electronically to couple with an electrical component 1325. For example, the power source 1305 can couple electronically coupled with the electrical component 1325. The power source 1305 can provide power to the electrical component 1325. The power source 1305 can include an anode 1310. The power source 1305 can include an electrolyte 1315. The power source 1305 can include a cathode membrane 115 (e.g., cathode 1320). The cathode membrane 115 can include the current collector 105. The current collector 105 can include a porous substrate. The cathode membrane 115 can include a layer that coats the porous substrate to provide a catalyst for the cathode membrane 115. The layer can be formed from a mixture of hausmannite and cation intercalated manganese oxide. The hausmannite can include $Mn_3O_4$. The cation intercalated manganese oxide can include $KMn_4O_{16}$. The mixture of hausmannite and cation intercalated manganese oxide can be prepared with carbon.

The electrolyte 1315 can be coupled with the anode 1310 and the cathode membrane 115 to convert energy stored in the power source 1305 to electrical energy to provide the power to the electrical component 1325. The electrolyte 1315 can be coupled with the anode 1310 and the cathode membrane 115 to convert chemical energy to electrical energy. The electrolyte 1315 can be coupled with the anode 1310 and the cathode membrane 115 to convert chemical energy to electrical energy to provide the power to the electrical component 1325. The electrical component 1325 can be coupled with (e.g., coupled to, connected to, etc.) the power source 1305. For example, the electrical component 1325 can be coupled with the anode 1310. The electrical component 1325 can be coupled with the cathode 1320.

Figure 14:
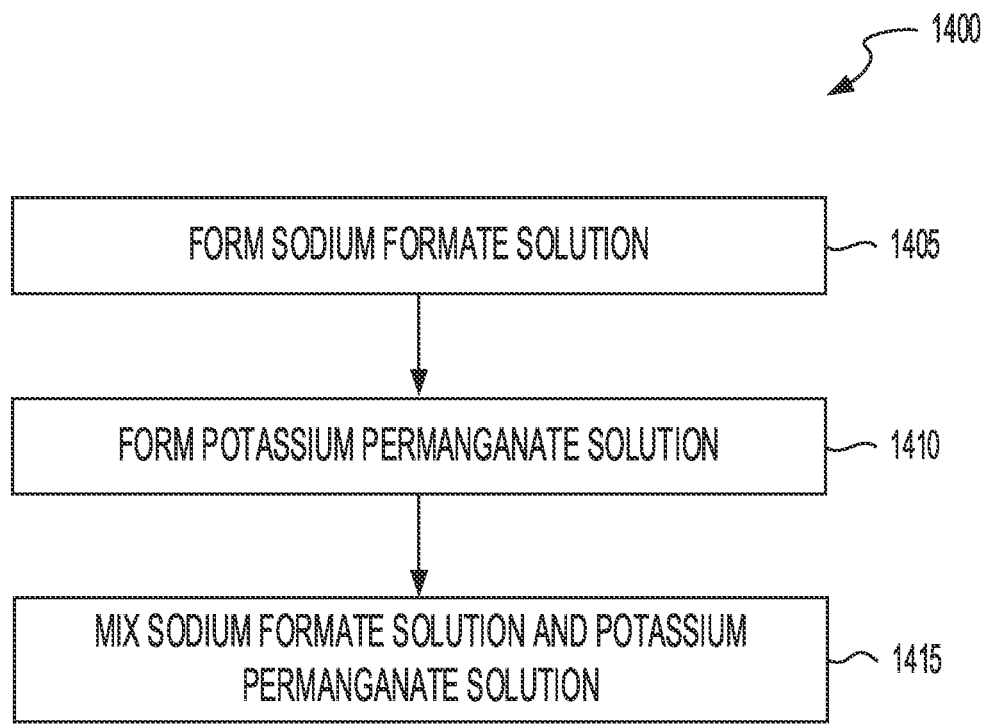
FIG. 14 illustrates a method of manufacturing an air cathode according to an example implementation.

FIG. 14 illustrates a method 1400 of manufacturing an air cathode. In brief summary, the method 1400 can include forming a sodium formate solution (BLOCK 1405). The method 1400 can include forming a potassium permanganate solution (BLOCK 1410). The method 1400 can include mixing the sodium formate solution with the potassium permanganate solution (BLOCK 1415).

The method 1400 can include forming a sodium formate solution (BLOCK 1405). For example, forming the sodium formate solution can include mixing sodium formate powder with deionized water (e.g., DI water). The sodium formate solution can be in a range of 1.0 molar to 2 molar (e.g., 1.0 molar, 1.1 molar, 1.2 molar, 1.3 molar, 1.4 molar, 1.5 molar, 1.6 molar, 1.7 molar, 1.8 molar, 1.9 molar, or 2.0 molar, inclusive). The sodium formate powder can be mixed with DI water at room temperature (e.g., 20° C., 21° C., 22° C., inclusive). The sodium formate powder can be mixed with DI water until the sodium formate powder is dissolved. For example, the sodium formate powder can be mixed with DI water for a time period of 1 minute, 2 minutes, 5 minutes, 10 minutes, or 15 minutes.

The method 1400 can include forming a potassium permanganate solution (BLOCK 1410). For example, forming the potassium permanganate solution can include mixing potassium permanganate powder with DI water. The potassium permanganate solution can be in a range of 0.1 molar to 1 molar (e.g., 0.1 molar, 0.2 molar, 0.3 molar, 0.4 molar, 0.5 molar, 0.6, molar, 0.7 molar, 0.8 molar, 0.9 molar or 1.0 molar, inclusive). The potassium permanganate powder can be mixed with DI water at a temperature in a range of 20° C. to 40° C. (e.g., 20° C., 25° C., 30° C., 35° C., or 40° C., inclusive). The potassium permanganate powder can be mixed with DI water until the potassium permanganate powder is dissolved. For example, the potassium permanganate powder can be mixed with DI water for a first time period of 15 minutes, 30 minutes, 45 minutes, 1 hour, 2 hours, or 3 hours at the temperature. The potassium permanganate powder can be mixed with DI water for a second time period of 30 minutes, 45 minutes, 1 hour, 2 hours, 3 hours, or 4 hours without any heat. For example, the potassium permanganate powder can be mixed with DI water for the second time period at room temperature (e.g., 20° C., 21° C., 22° C., inclusive).

The method 1400 can include mixing the sodium formate solution with the potassium permanganate solution (BLOCK 1415). The method 1400 can include mixing the sodium formate solution with the potassium permanganate solution to create a mixture of hausmannite and potassium intercalated manganese oxide. The method 1400 can include mixing the sodium formate solution with the potassium permanganate solution to create a mixture of hausmannite and potassium intercalated manganese oxide to create a catalyst. Creating a mixture of hausmannite and potassium intercalated manganese oxide can include mixing the mixture of the sodium formate solution and the potassium permanganate solution with carbon colloid. Mixing the sodium formate solution with the potassium permanganate solution can include reacting the sodium formate solution and potassium permanganate solution. Reacting the sodium formate solution and potassium permanganate solution can form hausmannite and potassium intercalated manganese oxide (e.g., the hausmannite and potassium intercalated manganese oxide complex). The synthesis of hausmannite and potassium intercalated manganese oxide can occur through the reaction of the sodium formate solution and potassium permanganate solution. The hausmannite and potassium intercalated manganese oxide complex can be made by mixing the potassium permanganate solution and the sodium formate solution. The volume by volume ratio of potassium permanganate solution to sodium formate solution can be in a range of 1 to 3 (e.g., 1, 1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, inclusive). The potassium permanganate solution can be added to sodium formate solution while stirring intermittently. The average rate of addition potassium permanganate solution to the sodium formate solution can be in a range of 1.0 mL/sec to 1.5 mL/sec (e.g., 1.1 mL/sec, 1.2 mL/sec, 1.3 mL/sec, 1.4 mL/sec, or 1.5 mL/sec, inclusive). The average rate of addition potassium permanganate solution to the sodium formate solution can be in a range of 0.1%/sec to 3%/sec (e.g., 0.1%/sec, 0.5%/sec, 1.0%/sec, or 1.5%/sec, inclusive). After the entire potassium permanganate solution is added, the solution can be mixed to achieve reaction completion. For example, the solution can be mixed for time period 5 minutes, 10 minutes, 15 minutes, or 20 minutes.

In some embodiments, the method 1400 can include performing a low sheer mixing of the mixture of the sodium formate solution with the potassium permanganate solution with carbon colloid and with a gelling agent solution. The active powder (e.g., mixture of the sodium formate solution, the potassium permanganate solution, and the carbon) can be mixed with a gelling solution (e.g., gelling agent solution). The gelling solution can include 0.5% by weight carboxymethyl cellulose solution. The active powder can be mixed with the gelling solution for a time period in a range of 1 minute to 10 minutes (e.g., 1 minute, 2 minutes, 3 minutes, 4 minutes, 5 minutes, 6 minutes, 7 minutes, 8 minutes, 9 minutes, or 10 minutes, inclusive). The mixing can be low sheer mixing. The mass-to-mass ratio for the gelling solution and catalyst/carbon powder can be in a range of 1 to 5 (e.g., 1, 2, 3, 4, or 5, inclusive). The active powder can be mixed with the gelling solution to produce a gelled active powder mixture.

The method 1400 can include degassing the low sheered mixture. Degassing the low sheered mixture can include vacuum degassing. The low sheered mixture can be degassed. For example, the low sheered mixture can be degassed in a vacuum of −29.5 in Hg. The vacuum degassing can occur after gelation of the catalyst/carbon powder. The vacuum degassing can occur after mixing of the gelling agent solution with the catalyst/carbon powder. The vacuum degassing can remove air bubbles from the mixture or prevent air bubble formation.

The method 1400 can include creating an active mass slurry with the low sheered mixture dispersed with polytetrafluoroethylene. The active mass slurry can form the active layer 120. The active layer 120 can act as a catalyst for the ORR. The active mass slurry can coat the current collector 105. For example, the active mass slurry can coat the impregnated nickel foam. Coating the hydrophobic mass infiltrated foam with the active layer 120 can include rolling the active mass slurry 705 onto the hydrophobic mass infiltrated foam. Coating the hydrophobic mass infiltrated foam can include coating the hydrophobic mass infiltrated foam after the infiltration process.

In some embodiments, the method 1400 can include coating a current collector with the active mass slurry to create a cathode membrane for a power source. The current collector can be formed of a foam impregnated with a hydrophobic mass.

In some embodiments, the method 1400 can include laminating a current collector with a backing layer and an active mass slurry to create a cathode membrane (e.g., press laminated air cathode) for a power source. Laminating the current collector with the backing layer can include positioning the active layer 120, the current collector mesh (e.g., current collector 105), and the backing layer 205 between a high temperature press. The current collector mesh can be disposed between the active layer 120 and the backing layer 205. The method 100 can include pressing the active layer 120, the current collector mesh, and the backing layer 205 together at a high temperature to create a press laminated air cathode (e.g., laminated air cathode membrane).

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of manufacturing an air cathode, comprising:
    forming a sodium formate solution;
    forming a potassium permanganate solution;
    mixing the sodium formate solution with the potassium permanganate solution to create a mixture of hausmannite and potassium intercalated manganese oxide to create a catalyst;
    shear mixing the mixture of the sodium formate solution with the potassium permanganate solution with carbon colloid and with a gelling agent solution at a rate of 500 rpm to 1000 rpm;
    degassing the sheared mixture; and
    creating an active mass slurry with the sheared mixture dispersed with polytetrafluoroethylene.

2. The method of claim 1, further comprising;
    coating a current collector with the active mass slurry to create a cathode membrane for a power source, wherein the current collector is formed of a foam impregnated with a hydrophobic mass.

3. The method of claim 1, further comprising:
    laminating a current collector with a backing layer and an active mass slurry comprising the catalyst to create a cathode membrane for a power source.

* * * * *